United States Patent Office 3,631,086
Patented Dec. 28, 1971

3,631,086
PRODUCTION OF ORGANO-SILICON COMPOUNDS
Klaus Seyfried, Cologne, Hans-Horst Steinbach, Schildgen, and Walter Noll, Opladen, Germany, assignors to Farbenfabriken Bayer Aktiengesellschaft, Leverkusen, Germany
No Drawing. Filed June 9, 1969, Ser. No. 831,704
Claims priority, application Germany, June 29, 1968, P 17 68 785.3
Int. Cl. C07f 7/02, 7/08, 7/18
U.S. Cl. 260—448.2 E 5 Claims

ABSTRACT OF THE DISCLOSURE

In a process for the production of an organo-silicon compound by the addition of a hydrogen-silane or -siloxane to an olefinically-unsaturated organic compound in the presence of a catalyst, the catalyst according to the invention is trimethyl-dipyridine-platinum-iodide of the formula $$(CH_3)_3Pt(C_6H_5N)_2I$$

---

The present invention relates to the production of organo-silicon compounds, and especially to the production thereof by the known addition reaction of organo-silicon compounds containing silicon-bound hydrogen to those organic compounds in which an aliphatic double bond exists between at least one pair of adjacent atoms, which addition reaction proceeds according to the scheme:

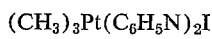

This invention is an improvement or modification of the invention which is described and claimed in our copending patent application Ser. No. 731,648.

It is known to carry out the above reaction with heating and to use catalysts in order not to be compelled to increase the temperature too high because of the risk of decompositions and side-reactions. The catalysts at present generally used in industry for this purpose are platinum on carrier materials, or compounds of platinum. In the latter case the platinum has the oxidation state +4, as in $PtCl_6H_2$ and in complex compounds derived therefrom, or the oxidation state +2, as in the complexes of $PtCl_2$ with unsaturated hydrocarbon compounds. In a number of cases the use of these platinum catalysts does not lead to satisfactory results. For example, in the addition reactions of those polysiloxanes which contain three or more Si-bound hydrogen atoms in one molecule, they bring about elimination of hydrogen resulting at least in a substantial reduction of the yield, and even in cross-linking of the siloxane leading to gel formation. Only platinum deposited on a carrier, for example aluminum oxide, would be more advantageous in this case, but the resulting heterogeneity of the reaction mixture leads to considerable difficulties in metering, distribution and conducting of the reaction.

In our application No. 731,648 a new catalyst is described which does not exhibit the disadvantages mentioned above and which consists of hexamethyl-dipyridine-diplatinum-diiodide of the formula:

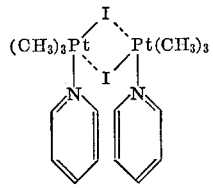

This compound has special advantages when a polysiloxane, containing three or more Si-bound hydrogen atoms in each molecule, is to be modified with certain carbon compounds, for example with allyl glycidyl ether. With the previously known catalysts which are soluble in the reaction components, the amounts of hydrogen eliminated from the HSi compounds are so substantial that the siloxane condensation taking place with an increase in viscosity and with cross-linking results at least in a considerable loss in yield of the desired reaction products and, in the case of high-polymeric siloxanes, eventually in a complete cross-linking resulting in a gel, the latter occurs, for example, when hexachloroplatinic acid is used.

Although hexamethyl-dipyridine-diplatinum-diiodide exhibits a number of substantial advantages in comparison with previously used catalysts, it is not completely satisfactory in those cases where the organo-hydrogen-siloxane to be reacted contains a fairly large amount of H-siloxane units, for example eight $-SiH(CH_3)-O-$ units. It has been found that the temperature range in which the reaction proceeds with sufficient speed, but without elimination of hydrogen or gelling and consequently with good yield, becomes progressively narrower with the increase in size of the molecule of the methyl-hydrogen-polysiloxanes. The consequent difficulty of controlling the temperature makes the necessary supervision and control difficult and costly.

It has now been found that this disadvantage is obviated or reduced by a modification of the above-mentioned platinum catalyst according to our application No. 731,648.

The invention provides a process for the production of an organo-silicon compound by the addition of a hydrogen-silane or -siloxane to an olefinically-unsaturated organic compound in the presence of a catalyst, wherein trimethyl-dipyridine-platinum-iodide of the formhula:

$$(CH_3)_3Pt(C_6H_5N)_2I$$

is used at catalyst.

This catalyst makes possible the use of a greater temperature range for successfully carrying out the reaction so that the risk of gelling, due to over-heating of the reaction mixture, is substantially reduced. In addition (contrary to what appears from the production instructions in "Journal of the Chemical Society," London, 1951, pages 299 to 302) this catalyst can be obtained in a simpler manner and with larger yields than the complex platinum compound used according to our application No. 731,648 and, to attain a given space/time yield in a continuous process, only approximately half as much platinum is required as is required in the process according to No. 731,648. However, the advantages of the latter process are retained, including the homogeneous solubility in the reaction mixture, the very slight activity at room temperature and the extensive inertness as regards undesired reaction possibilities of Si-bound hydrogen, for example with water, C-bound hydroxyl or epoxy groups.

The amount of the catalyst is generally within the range from 0.1 to 50 mg. per kilogram of reaction mixture.

A temperature between 100 and 200° C. is generally required for rapid and complete reaction. In each individual case, the temperature may depend on the structures of the reaction components and can be determined by experiment. In any case, virtually no reaction takes place at room temperature or at a slightly elevated temperature, so that it is possible to prepare a stable homogeneous mixture of all the components, including the catalyst, and to cause the reaction to proceed at any time by heating. This is especially advantageous in those cases where, by means of the addition of a silicon compound containing three or more Si-bound hydrogen atoms, liquid olefinically substituted organo-polysiloxanes are to be converted into cross-linked, for example rubber-elastic, solid moldings or coatings.

Since the addition reaction proceeds to a large extent exothermally, care must be taken sufficiently to eliminate the reaction heat in order to prevent over-heating. This can be achieved by starting with one of the reaction components, expediently together with the catalyst in order to maintain a high concentration of the latter from the beginning, and, after heating this mixture, slowly adding the other reaction component or, in a continuous process, by pouring both components simultaneously and in stoichiometric proportions into a reaction vessel from which the reaction product is continuously discharged, the dimensions of the reaction vessel being devised in accordance with the rate of flow to ensure the necessary elimination of heat.

In the last-mentioned case, the solubility of the catalyst according to the invention, which can be admixed with one of the reaction components, is of special advantage in that no metering difficulties arise.

The following example illustrates the invention:

EXAMPLE

Into a heatable reaction vessel of 30 litres capacity the contents of which are continuously kept at a temperature of 175° C. while being thoroughly mixed by means of a circulating pump, the following reaction components are fed cold and at an even rate:

11.7 kg. of a polysiloxane of the formula:

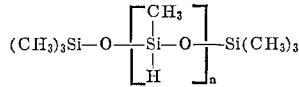

with an average value of $n=8$, and 22.9 kg. allyl glycidyl ether in which, per kilogram, 2.3 mg. trimethyl-dipyridine-platinum iodide are dissolved.

The over-flowing product is continuously passed through a film evaporator in which it is liberated at 170° C./20 mm. Hg from excess allyl glycidyl ether. As discharged liquid there are hourly obtained 28.4 kg. of a polysiloxane which corresponds, according to analysis and infra-red spectrum, to the formula

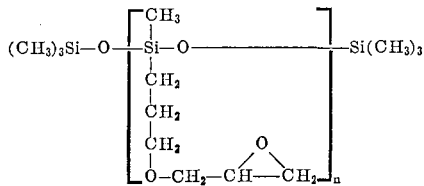

with an average value of $n=8$.

In this way, six experiments were carried out, each lasting 24 hours. In not one of these experiments was an undesirable increase in viscosity or gelling observed.

These results may be contrasted with the following control experiments in which as catalyst hexamethyl-dipyridine-diplatinum-diiodide was used.

(a) With the same proportions of the two reactants as in the example, the amount of the catalyst was 1.95 mg. for each kg. allyl glycidyl ether and consequently the same Pt content was maintained in the ether as according to the example. To start the reaction, the temperature had to be raised to 195° C.; this had the consequence that the reaction mixture gelled after a short time.

(b) Six further control experiments were then carried out with double the amount of catalyst as compared with experiment (a). In this case the temperature required amounted to 185° C. The result of four of these experiments was the same as that according to the example; however, due to chance overheating, in the other two experiments the reaction mixtures gelled as in experiment (a).

What is claimed is:

1. In a process for the production of an organo-silicon compound by the addition of a hydrogen-silane or -siloxane to an olefinically-unsaturated organic compound in the presence of a catalyst, the improvement which comprises using trimethyldipyridine-platinum-iodide of the formula

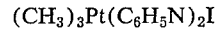

as the catalyst.

2. Process according to claim 1 wherein the said catalyst is used in an amount between 0.1 and 50 mg. per kilogram of the reaction mixture.

3. Process according to claim 1 wherein the reaction is effected at a temperature between 100 and 200° C.

4. Process according to claim 1 wherein the said catalyst is mixed with one of the reactants, this mixture is heated, and the other reactant is gradually added to the mixture.

5. Process according to claim 1 wherein stoichiometric amounts of the reactants and said catalyst are poured simultaneously and continuously into a reaction vessel and the reaction product is continuously discharged therefrom.

References Cited

UNITED STATES PATENTS

| | | | |
|---|---|---|---|
| 2,823,218 | 2/1958 | Speier | 260—448.2 E |
| 2,970,150 | 1/1961 | Bailey | 260—448.2 E X |
| 3,159,601 | 12/1964 | Ashby | 260—448.2 E X |
| 3,159,662 | 12/1964 | Ashby | 260—448.2 E |
| 3,220,972 | 11/1965 | Lamoreaux | 260—448.2 E X |
| 3,271,362 | 9/1966 | Chalk et al. | 260—448.1 E X |
| 3,296,291 | 1/1967 | Chalk et al. | 260—448.2 E |
| 3,419,593 | 12/1968 | Willing | 260—448.2 E |
| 3,439,014 | 4/1969 | Patton et al. | 260—448.2 E |
| 3,470,225 | 9/1969 | Knorre et al. | 260—448.2 E |
| 3,474,123 | 10/1969 | Kelly et al. | 260—448.2 E |

TOBIAS E. LEVOW, Primary Examiner

P. F. SHAVER, Assistant Examiner

U.S. Cl. X.R.

260—46.5 R, 448.8 R